United States Patent [19]

Siegfried

[11] 4,107,831
[45] Aug. 22, 1978

[54] PRESSURE ROLLER
[75] Inventor: Armin Siegfried, Köniz, Switzerland
[73] Assignee: Escher Wyss Limited, Zurich, Switzerland
[21] Appl. No.: 821,093
[22] Filed: Aug. 2, 1977
[30] Foreign Application Priority Data
Aug. 10, 1976 [CH] Switzerland .................. 10160/76
[51] Int. Cl.² ............................................ B21B 13/02
[52] U.S. Cl. ................................ 29/116 AD; 29/123
[58] Field of Search ............ 29/116 AD, 116 R, 123

[56] References Cited
U.S. PATENT DOCUMENTS

| 2,800,704 | 7/1957 | Mohn | 29/123 |
|---|---|---|---|
| 3,340,575 | 9/1967 | Sievers | 29/123 X |
| 3,638,292 | 2/1972 | Gaghan | 29/116 AD X |
| 3,838,480 | 10/1974 | Depuy | 29/116 AD X |
| 3,921,514 | 11/1975 | Biondetti | 29/116 AD X |

FOREIGN PATENT DOCUMENTS 678,180  7/1939  Fed. Rep. of Germany ........ 29/116 R Primary Examiner—Dorsey Newton
Attorney, Agent, or Firm—Robert A. Ostmann

[57] ABSTRACT

Pressure roller with a non-rotatably mounted axial support about which a roller shell can rotate which is supported in a supporting plane on the support by hydrostatic supporting elements and is mounted to be rotatable and is guided axially and also radially at both ends by means of a guide ring arranged at each roller shell edge, the said guide ring being non-rotatable relatively to the support but capable of displacement axially and along the supporting plane; for holding the guide rings in a desired axial position relatively to the support there is situated at each end of the roller shell a device, at the side of the guide ring, the said device elastically pressing the guide ring in the axial direction towards the respective adjacent edge of the roller shell.

8 Claims, 2 Drawing Figures

PRESSURE ROLLER

BACKGROUND OF THE INVENTION

The invention relates to a pressure roller with a non-rotatably mounted axial support about which a roller shell is capable of rotating, the said shell being supported on the support in a supporting plane by hydrostatic supporting elements, and being rotatably mounted and guided both axially and radially at both ends by means of a guide ring in each case arranged at the roller shell edge, the said ring being non-rotatable relatively to the support but capable of displacement axially and along the supporting plane.

Pressure rollers of this kind are known for the pressure treatment of webs of material such as for example paper. Under load, the support bends and thus deviates from the axis line of the roller shell. But the guide rings remain on the axis of the roller shell, since they are capable of displacement along the supporting plane and axially relatively to the support. According to a known constructional form, the guide rings comprise an elongated aperture with guide surface which are arranged symmetrically relatively to the supporting plane and are guided along flat portions constructed symmetrically relatively to the supporting plane on the support. The flat portions also allow axial displacement of the guide rings relatively to the support. The guide rings can also tilt relatively to the support and thus remain at right angles to the axis of the roller shell when the support bends under load.

To hold the guide rings in a desired axial position relatively to the support, hitherto blocks or pins have been provided which were supported for example on the support and limited axial displacement but did allow the tilting of the guide rings relatively to the support.

This hitherto known construction described hereinbefore was found to be satisfactory with pressure rollers having metal shells. In contrast, difficulties were encountered when using elastomeric roller shells. The fact is that these cannot be produced with the desired precision achieved with metal shells and also are found to be subjected to certain variations in dimensions when under load. All this results unavoidably in the case of elastomeric roller shells in non-circular running, particularly at the edges. This untrue running is transmitted to the guide rings, which are forced to wobble relatively to the support. This wobbling results in premature wear on for example the blocks or pins, or the guide surfaces of the guide rings, or the flat portions on the support respectively, and has resulted for example in the guide ring knocking against the support.

SUMMARY OF THE INVENTION

The invention aims at making it possible to use an elastomeric roller shell with a pressure roller without involving operating disturbances. The invention also aims at simplifying the mounting and guiding of the guide rings on the support at the production stage. According to the invention this object is achieved in the pressure roller initially described in that for holding the guide rings in a desired axial position relatively to the support there is provided at each end of the roller shell a device at the side of the guide ring which presses the guide ring elastically in an axial direction against the respective adjoining edge of the roller shell. Thus the devices arranged at the two ends of the roller shell press elastically towards one another so that the roller shell is held in a desired axial position between the two guide rings. Any non-circular running or dimension variations of the roller shell are taken up elastically by the devices and compensated without damaging the guide rings or the support. Parts which are complicated to produce, for example blocks, pins and slots corresponding to these on the associated parts, are dispensed with.

BRIEF DESCRIPTION OF THE DRAWING

The subject of the invention is described in detail hereinafter and explained with reference to drawings. In the drawings.

DESCRIPTION OF THE PREFERRED EMBODIMENTS

Figure 1:
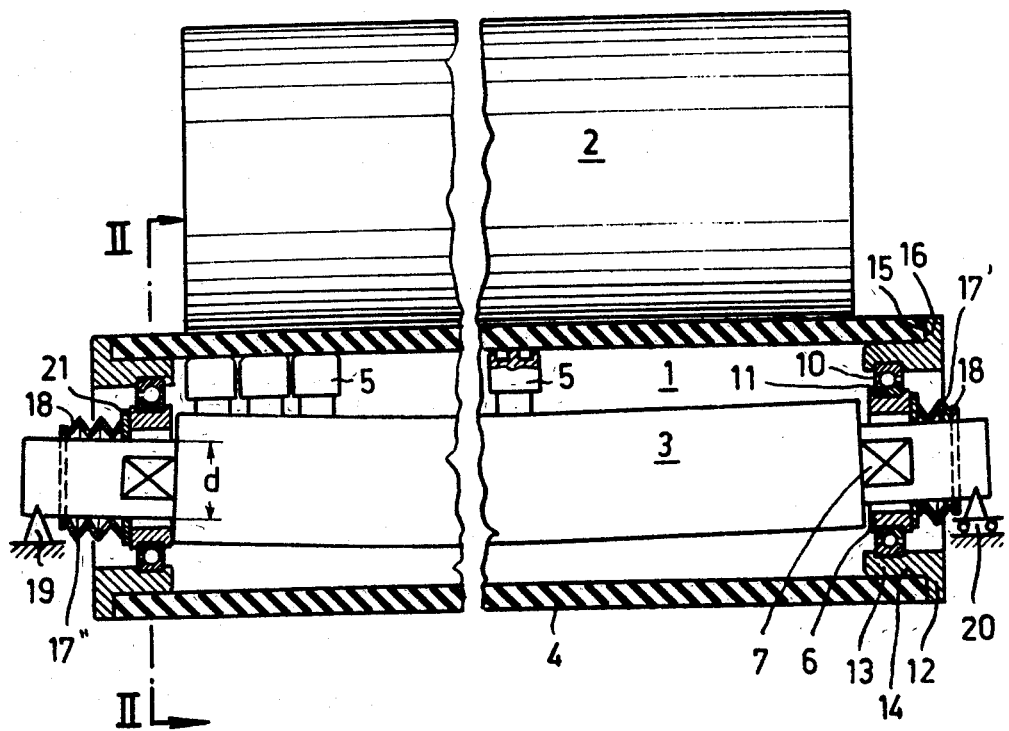
FIG. 1 shows a constructional example of a pressure roller according to the present invention in a diagrammatic longitudinal section.

The pressure roller 1 is driven by a counter-roller 2 which is shown in a simplified manner in the drawings. Thus it rotates when the counter-roller 2 rotates.

The pressure roller 1 is provided with an axial support 3 mounted non-rotatably in a frame which is only indicated in diagrammatic manner with 19 and 20 in the drawings, and the roller shell 4 is capable of rotating about the said support. The roller shell 4 is made of an elastomeric material, for example reinforced rubber, and is supported on the support 3 by hydrostatic supporting elements 5 of which only a few have been shown in order not to complicate the drawings. They are arranged in a row on the support 3 and thus form a supporting plane which coincides with the section plane of FIG. 1, and they take up the load of the pressure roller 1. The roller shell 4 is guided and mounted by means of guide rings 6 which are arranged at the edge of the roller shell 4 respectively, one at each end.

Figure 2:
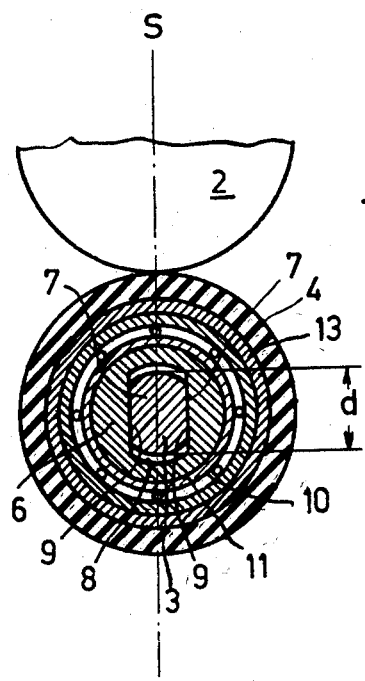
FIG. 2 shows a section taken on the line II—II of FIG. 1.

Each guide ring 6 is arranged to be non-rotatable relatively to the support 3 but capable of displacement along the supporting planes, as FIG. 2 shows particularly clearly, and in the axial direction. For this purpose the support comprises for each guide ring 6, symmetrically at the two sides of the supporting plane S and parallel to it, flat portions 7 which correspond to guide surfaces 9 in an elongated aperture 8 in the guide ring 6. There is an easy sliding fit between the flat portions 7 and the guide surfaces 9. Otherwise the elongated aperture 8 is larger by the amount of a clearance than the non-flattened diameter d of the support 3. Thus the guide rings 6 can remain at right angles to the axis of the roller shell even when the support 3 has been made to bend under the loading of the supporting elements 5, this state of affairs being shown in FIG. 1 in an exaggerated fashion for the sake of clarity.

The roller shell 4 is mounted to be rotatable at each of its edges at the guide rings 6 and also guided axially and radially. For this purpose there is arranged an angular contact ball bearing 10 which can take axial load and whose internal ring 11 is secured relatively to the guide ring 6. The external ring of the bearing 10 could carry the roller shell 4. In the illustrated example, since this is an elastomeric roller shell, it is appropriate to arrange between the external ring of the bearing 10 and the roller shell 4 an intermediate ring 12 for holding securely the edge of the roller shell. The intermediate ring 12 is secured relatively to the external ring of the ball bearing 10 and can be inserted easily in the roller shell 4. It comprises a flange surface 15 which is adapted to abut against the end face 16 of the roller shell edge.

A necessary force-locking effect between the flange surface 15 of the intermediate ring 12 and the end face 16 of the roller shell edge in each case is achieved by the elastic pressure of the devices which are provided at the both ends of the roller shell 4, in each case at the side of the guide rings 6, and press the guide rings 6 and the flange surfaces 15 respectively in the axial direction elastically towards the respective abutting edge, and the end face 16 of the shell as appropriate.

The device which is provided at the side of the guide ring 6 in each case comprises a spring and in the case illustrated this is a cup spring assembly 17. The spring, i.e. the cup spring assembly 17, is supported at one side on the non-rotatable support 3 by means of a supporting ring 18 secured on the support 3. At the other side the cup spring assembly presses against the guide ring 6 by way of a sliding ring 21 which is arranged to be capable of sliding relatively to the guide ring.

It would be possible, and would provide certain advantages, to support the spring on a frame in which the pressure roller is mounted. Instead of the spring provided it would also be possible to use for the device concerned for example pneumatic or hydro-pneumatic pressure elements.

Each of the cup spring assemblies 17 can have the same spring rate, i.e., the same force vs. displacement characteristic. But if it is expected that there will be expansion of the support 3 and the roller shell 4, the arrangement shown in FIG. 1 is advantageous. The support 3 is mounted at one side, at the left in the illustration, in a frame by means of a bearing arrangement 19 which allows bending of the support 3 but does not allow displacement of the support in an axial direction. At the opposite side, at the right in the illustration, the support is mounted in the frame by means of a bearing arrangement 20 which allows bending and also axial sliding of the support 3 in the frame. Thus, the support can expand towards the right unhindered, for example when subjected to the action of heat. At this side, at the right in the illustration, the cup spring assembly 17' arranged here has a greater spring rate than the opposite spring assembly 17'', at the left in the illustration. This is shown at the right and left in the illustration with different numbers of cup springs in the assemblies 17' and 17''. Then if the roller shell 4 expands under the action of heat, this expansion takes place towards the left so that the roller shell remains substantially always in the same axial central position.

The invention is not limited to the use of elastomeric roller shells. With metal roller shells for example it is additionally advantageous to give the surface 13 of the intermediate ring 12 capable of being inserted in the roller shell a conical shape. In this way the roller shell is guided precisely in the radial direction even if its diameter increases under the action of heat. The flange surface 15 of the intermediate ring 12 described hereinbefore is not required in this case.

The construction of the guide surfaces 9 of the elongated aperture 8 in the guide ring 6 and the flat portion 7 on the support 3 described hereinbefore allows, within the limits of a selected fit, sufficient freedom of movement for the wobbling of the guide rings in the case of non-circular running of the roller shell, which is taken up elastically by the devices with the springs. It will be usual to provide the guide surfaces 9 for example with a layer of polytetrafluoroethylene. In the case of extremely severe wobbling it would be possible for example in each case between the flat portions and the guide surface to insert a sliding element convex towards the guide surface, and to give the guide surface a correspondingly concave shape. This would allow unhindered tilting of the guide ring at right angles to the supporting plane also. Or for the same purpose it would also be possible to replace the angular contact ball bearing 10 by a self-aligning roller bearing or a spherical roller bearing.

I claim:

1. Pressure roller with a non-rotatably mounted axial support about which a roller shell can rotate which is supported in a supporting plane on the support by hydrostatic supporting elements and is mounted to be rotatable and is guided axially and also radially at both ends by means of a guide ring arranged at each roller shell edge, the said guide ring being non-rotatable relatively to the support but capable of displacement axially and along the supporting plane, in which pressure roller, for holding the guide rings in a desired axial position relatively to the support, there is situated at each end of the roller shell a device, at the side of the guide ring, the said device elastically pressing the guide ring in the axial direction towards the respective adjacent edge of the roller shell.

2. Pressure roller according to claim 1, in which between the roller shell and the guide ring there is situated an intermediate ring for holding securely the edge of the roller shell, which is rotatably mounted on the guide ring and guided axially and radially.

3. Pressure roller according to claim 2, in which the roller shell is made of an elastomeric material and the intermediate ring comprises a flange surface which is adapted to abut on the end face of the roller shell edge.

4. Pressure roller according to claim 1, in which the device provided at the side of the guide ring in each case comprises a spring which presses towards the guide ring in the axial direction.

5. Pressure roller according to claim 4, in which the spring in the device is a cup spring assembly.

6. Pressure roller according to claim 1, in which the device is supported on the non-rotatable support.

7. Pressure roller according to claim 4, in which the spring in one device has a greater spring rate than the spring in the other device.

8. Pressure roller according to claim 7, in which the non-rotatable support is mounted in a frame at one of its ends to be axially non-displaceable and at the opposite end to be axially displaceable in the frame, the device with the spring which has the steeper spring force characteristic being arranged at this side of the support which is mounted to allow displacement.

* * * * *